T866018

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 702

754,989
PROCESS FOR IMPROVING TRACTION ON SURFACES

William M. Pearson, 57 Gillan Ave., Warwick, R.I. 02886

Filed Aug. 23, 1968. Published Sept. 16, 1969
Int. Cl. E01c *11/24*
U.S. Cl. 94—22
No Drawing. 6 Pages Specification

The present invention concerns applying abrasive materials wetted with a glycol composition to airport runways, highways, and other surfaces used by wheeled vehicles, when said surfaces are coated with ice or snow. The resulting ice-abrasive-glycol coated surface provides excellent traction for wheeled vehicles.